United States Patent [19]

Mueller

[11] 4,200,961
[45] May 6, 1980

[54] SEPARATING MEAT FROM SHELL

[76] Inventor: Joseph F. Mueller, 56 Holbrook Ave., Hull, Mass. 02045

[21] Appl. No.: 877,171

[22] Filed: Feb. 13, 1978

[51] Int. Cl.² ............................................. A22C 29/00
[52] U.S. Cl. .......................................... 17/73; 17/66; 30/120.1; 30/137
[58] Field of Search ................... 17/66, 69, 71, 72, 73, 17/74, 75; 30/322, 120.1, 120.2, 137, 147

[56] References Cited

U.S. PATENT DOCUMENTS

| 60,369 | 2/1922 | Quandee et al. | 30/147 X |
| 849,098 | 4/1907 | Aufrichtig | 30/147 X |
| 1,720,575 | 7/1929 | Smith | 30/120.2 |
| 3,846,908 | 11/1974 | Allievi | 30/120.1 |

FOREIGN PATENT DOCUMENTS 230885 2/1911 Fed. Rep. of Germany ............. 17/66

Primary Examiner—Willie G. Abercrombie
Attorney, Agent, or Firm—Charles Hieken

[57] ABSTRACT

A lobster fork has a short ridged claw tine, a thumb indent opposite the claw tine and a spurred tine.

10 Claims, 5 Drawing Figures

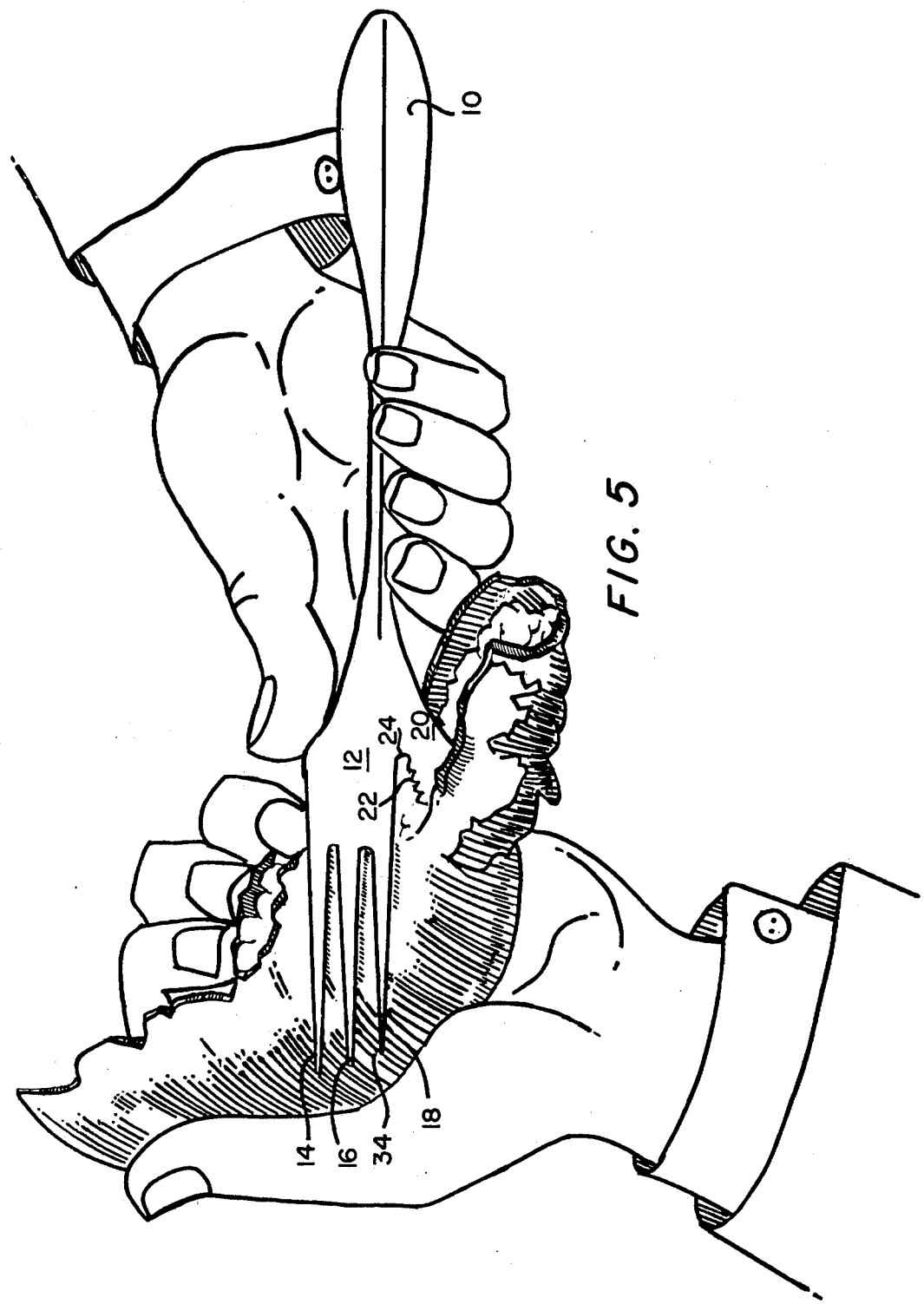

SEPARATING MEAT FROM SHELL

BACKGROUND OF THE INVENTION

The present invention relates in general to removing meat from shells and more particularly concerns novel apparatus and techniques for removing meat from lobsters by use of an inexpensive tool in a manner that facilitates removal while sharply reducing splattering typically experienced with crackers normally used to crack a lobster claw.

The typical prior art approach involves using nutcrackers to crack the lobster shell by compressing the shell. The resultant cracking is frequently accompanied by splattering liquid in random directions from inside the shell. Thus, it is common for lobsters to be served with bibs to be worn by the eater. While protecting the covered portions of the eater, the bib does not protect those in the vicinity of the lobster eater unprotected by bibs. Furthermore, after completing the cracking, the eater normally uses a small fork to remove the meat from the cracked shell.

Accordingly, it is an important object of the invention to provide improved methods and means for removing meat from shells.

It is a further object of the invention to achieve one or more of the preceding objects while sharply reducing splattering in the process of separating shell and meat.

It is still a further object of the invention to achieve one or more of the preceding objects with a single tool that may be used both for cracking the shell and removing the meat from the cracked shell.

It is still a further object of the invention to achieve one or more of the preceding objects with a tool that is relatively easy and inexpensive to manufacture and sufficiently low in cost that it may be a single-use device.

It is still a further object of the invention to achieve one or more of the preceding objects while sharply reducing splatter.

SUMMARY OF THE INVENTION

According to the invention, a fork includes a handle, a midsection formed at the end of the handle and tines extending from the midsection, the tines all being generally in an arcuate plane defining a common surface, including an outermost claw tine that is at an angle in said common surface to the other tines which are generally parallel to each other.

According to other features of the invention the claw tine is shorter than the other tines, it extends from the midsection closer to the handle than do the other tines, and it has an edge opposite the midsection that is ridged.

According to still other features of the invention, the midsection has an edge opposite the claw tine that is folded to form a thumb indent surface generally perpendicular to the plane of the midsection, and one of the other tines has a spur at its end. The method of the invention includes opening lobster shell in which such a lobster fork is grasped by the hand about the handle where it meets the midsection in such a way that the thumb rests upon the thumb indent, and edge of the lobster shell is inserted between the claw tine and the midsection, and the handle is used as a lever to peel open the shell.

Numerous other features, objects and advantages of the invention will become apparent from the following specification when read in connection with the accompanying drawing in which:

BRIEF DESCRIPTION OF THE DRAWING

FIG. 5 is a perspective view of the fork being used to pry open the lobster claw according to the invention.

DETAILED DESCRIPTION OF PREFERRED EMBODIMENTS

Figure 1:
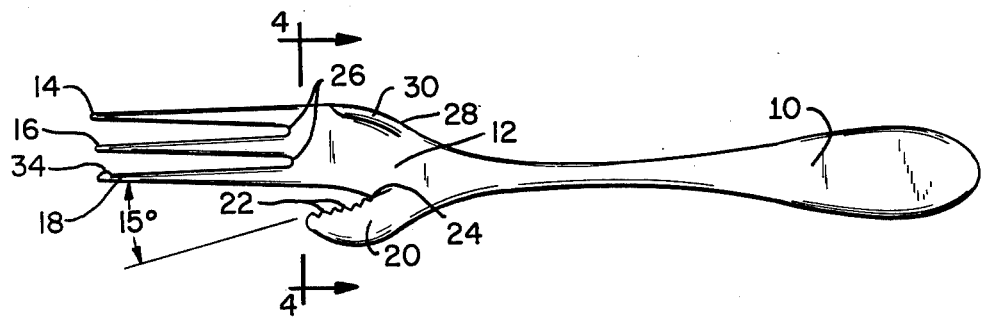
FIG. 1 is a plan view of a fork embodying the invention.
Figure 2:
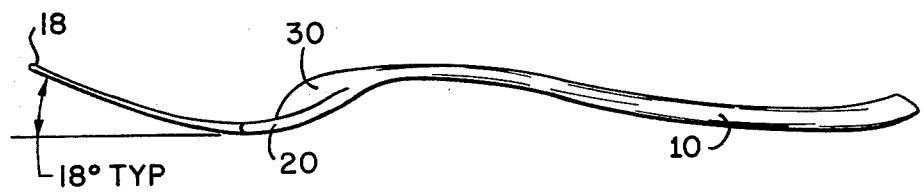
FIGS. 2 and 3 are elevation views of opposite sides of the fork.
Figure 3:
Figure 4:
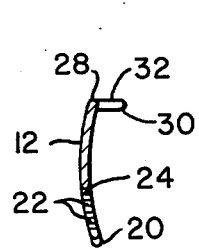
FIG. 4 is a sectional view through section 4—4 of FIG. 1.

With reference now to the drawing and more particularly FIG. 1, there is shown a lobster fork having a handle 10, a midsection 12, and tines 14, 16, 18 and 20. The fork may be made of metal, plastic, or some other suitable material. All the elements just described are generally co-planar, as is typical for forks. As may be seen in FIGS. 2 and 3, however, the fork has a slight curvature in the handle for ease of grasping the handle, and a slight curvature of the tines 14, 16, 18 and 20 for easy manipulation of food.

Three of the tines shown, namely tines 14, 16 and 18 are generally parallel in the usual manner of fork construction. The fourth, outermost tine 20 is a claw tine at an angle to the midsection 12. In the embodiment shown, the angle is about 15°. Claw tine 20, as shown, is shorter than the other tines 14, 16 and 18. It has a series of ridges 22 on the edge of the tine facing midsection 12. Furthermore, claw tine 20 extends from midsection 12 at a point 24 closer to handle 10 than the other tine 14, 16 and 18 which extend from midsection 12 at points 26.

The edge 28 of midsection 12 opposite claw tine 20 is folded to form a thumb indent 30 having a surface 32 perpendicular to the plane of midsection 12. A spur 34 is located on the inside edge of tine 18.

In use, the lobster fork is grasped by the hand as shown in FIG. 5, so that the hand is about handle 10 of the fork where it meets midsection 12 in such a way that the thumb rests upon the surface 32 of thumb indent 30. An edge of the lobster is inserted between claw tine 20 and midsection 12, and the handle 10 is used as a lever to peel the shell. The angle between claw tine 20 and midsection 12 is 15° in the embodiment shown or can be selected to be any angle large enough to conveniently provide for inserting a shell between the tine and midsection. The ridges 22 of claw tine 20 aid in the peeling procedure by increasing the friction between tine and shell.

The point 24 at which claw tine 20 extends from mid-section 12 is located where it is so that during the peeling process the force of the peeling or prying operation can be absorbed by the full breadth of the lobster fork cross section 12 instead of the more delicate tines 14, 16 and 18.

Claw tine 20 is long enough to perform its function, and short enough to not prevent use of the remaining tines 14, 16 and 18 of the lobster fork in the ordinary way. The spur 34 on the inside edge of tine 18 may be used to remove lobster meat from the small extremities of the lobster and other areas. It is located on the inside edge of the tine so that it will not interfere with use of tines 14, 16 and 18 during ordinary use; that is, it will not catch on the edge of the mouth.

The present invention is characterized by a number of features especially advantageous when dining on lobsters. All major sections of the lobster may be opened by causing the shell to crack as shown in FIG. 5. The present invention takes advantage of structural characteristics of a crustacean shell, such as that of a lobster. The shell is designed to offer maximum protection from outside attack and thus exhibits great strength in compression. The shell cracks relatively easily when exposed to inside pressure to facilitate allowing the lobster to shed its shell as it grows and thus is relatively weak in tension. The present invention takes advantage of these shell structural characteristics by using apparatus and techniques for cracking the shell by applying pressure from the inside of the shell and thereby facilitating separation of meat from shell with relatively little effort and through the use of a tool having weight, cost and structural characteristics significantly less demanding than the nutcrackers commonly used while virtually eliminating squirting and splattering. Furthermore, the fork according to the invention may be used not only for cracking the shell but also for eating and removing meat from the shell.

There has been described a novel device and method for separating meat from shell that is simple and convenient. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. a fork comprising a handle,
a midsection formed at the end of said handle,
and tines extending from said midsection,
said tines all being generally in an arcuate plane, said plane defining a common surface, said tines including a plurality of generally parallel tines and an outermost claw tine shorter than said parallel tines, said claw tine being disposed at an angle in said common surface to the other said tines.

2. The fork of claim 1 in which said claw tine is shorter than said other tines.

3. The fork of claim 2 in which said claw tine extends from said midsection closer to said handle than do said other tines.

4. The fork of claim 3 in which said claw tine has an edge opposite said midsection having means for increasing the friction between said claw tine and a shell to be cracked.

5. The fork of claim 1 in which said midsection has an edge opposite said claw tine having a thumb indent surface generally perpendicular to the plane of said midsection.

6. The fork of claim 4 in which said means for increasing the friction comprises ridges.

7. The fork of claim 1 in which one of said other tines has a spur at its end.

8. The fork of claim 1 wherein said claw tine is shorter than said other tines, extends from said midsection closer to said handle than to said other tines,
has an edge opposite said midsection that is ridged,
said midsection having an edge opposite said claw tine that is folded to form a thumb indent surface generally perpendicular to the plane of said midsection,
and in which one of said other tines has a spur at its end.

9. A fork comprising,
a handle,
a midsection formed at the end of said handle,
and tines extending from said midsection,
said tines all being generally in a common surface and including an outermost claw tine that is at an angle to the other said tines,
one of said other tines having a spur at its end.

10. The fork of claim 9 wherein said claw tine is shorter than said other tines, extends from said midsection closer to said handle than to said other tines and has an edge opposite said midsection that is ridged,
said midsection having an edge opposite said claw tine that is folded to form a thumb indent surface generally perpendicular to the plane of said midsection.

* * * * *